3,349,212
WELDING AND SCARFING APPARATUS
Jack Morris, Monsey, and John Toohey, New Rochelle, N.Y., assignors to American Machine & Foundry Company, New York, N.Y., a corporation of New Jersey
Filed Dec. 23, 1964, Ser. No. 420,639
12 Claims. (Cl. 219—59)

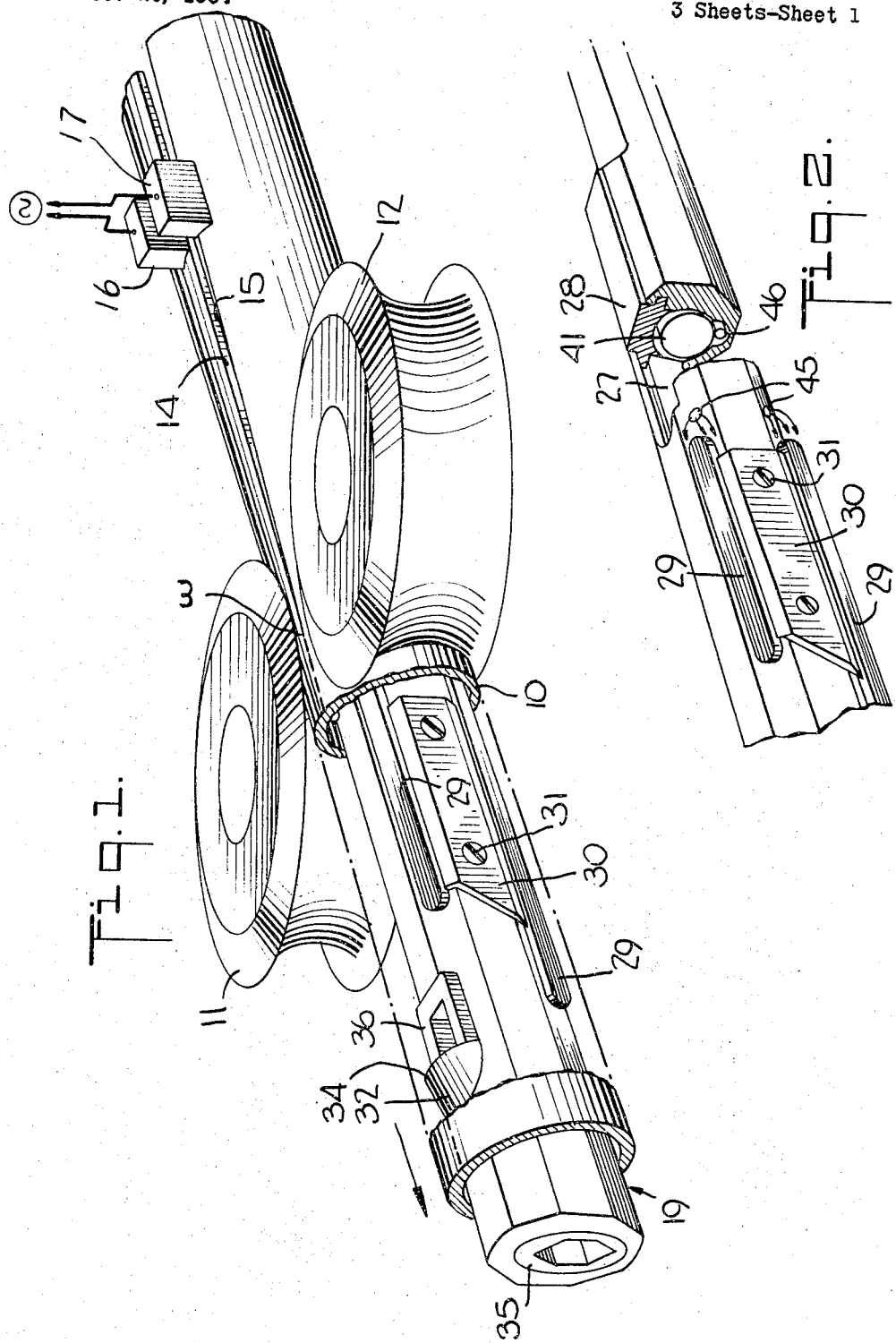

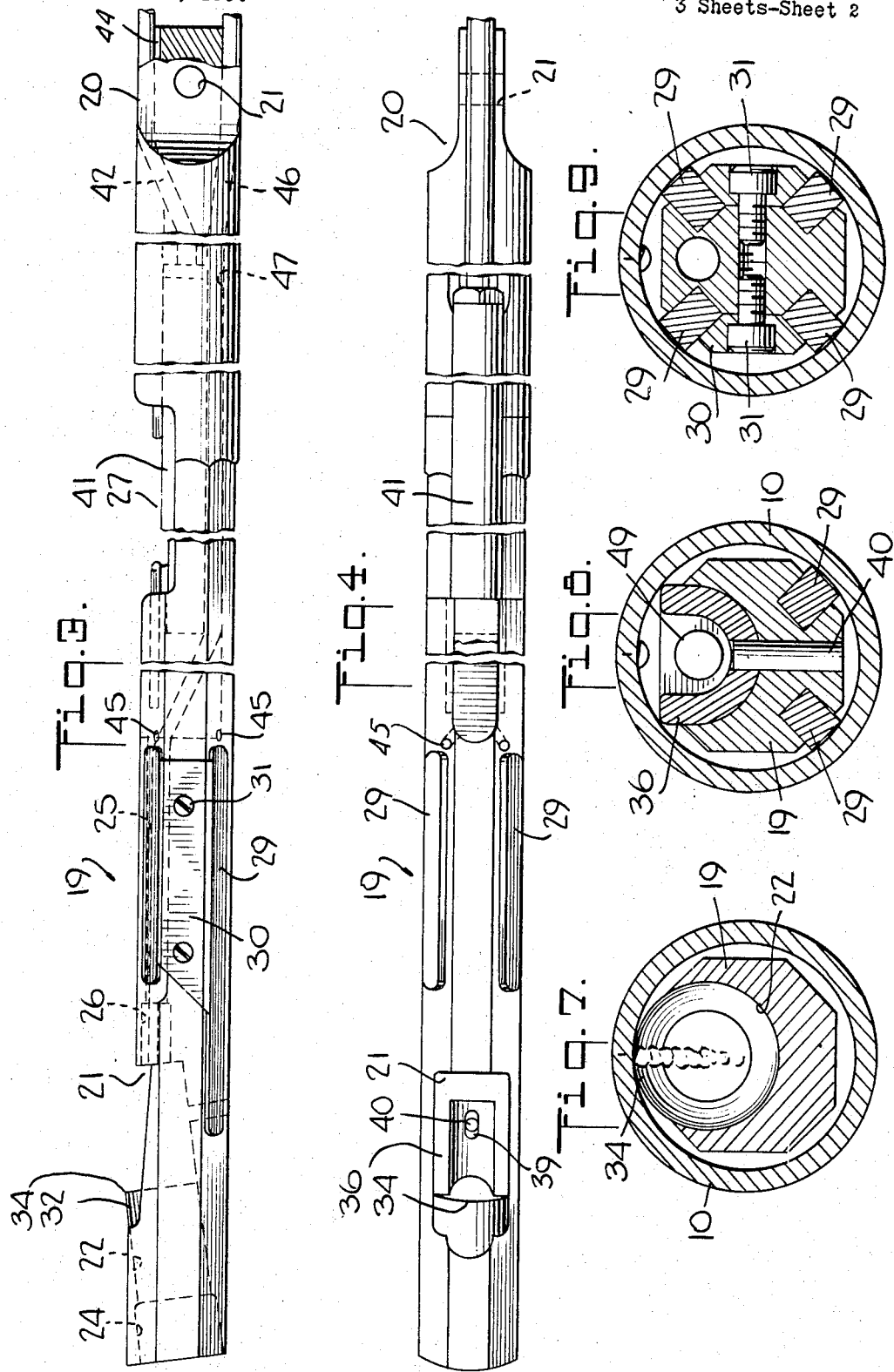

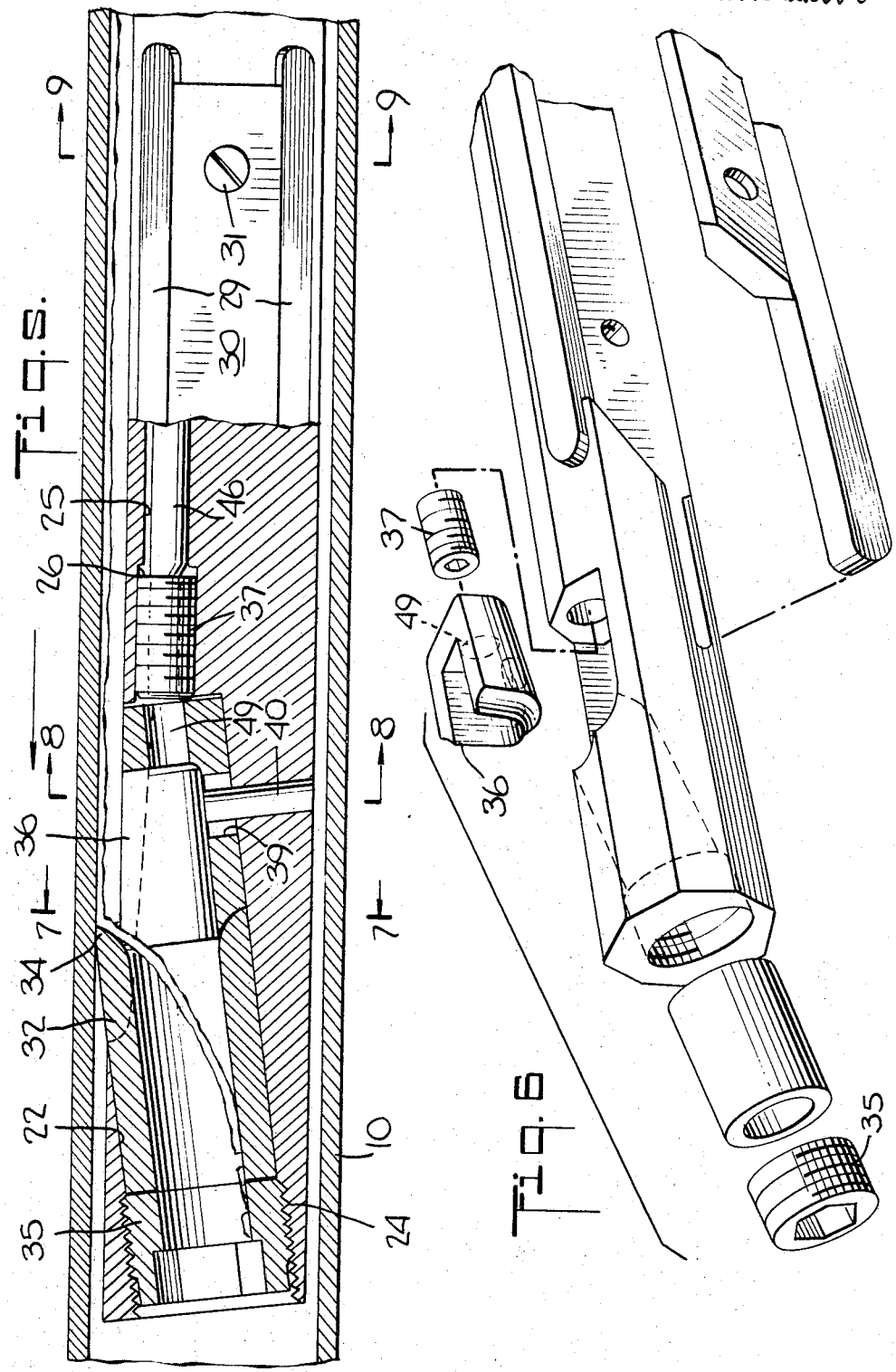

This invention relates to tube welding, and more particularly, to apparatus for scarfing the internal bead formed as a consequence of the continuous welding of tubing formed of metal such as stainless steel as by electromagnetic induction or high frequency resistance heating, for example.

Heretofore, preferred commercial methods for welding such seams have involved either establishing the heating current in the edges to be welded by electromagnetic induction, or in other cases by so positioning the edges to be welded that they form a V-shaped gap in advance of the weld point so that current from a high frequency source is directly applied by contacts to flow thereon along the edges of the V-shaped gap to and from the weld point. Such a method is disclosed in the patent of Wallace C. Rudd and Robert J. Stanton, No. 2,818,488 dated Dec. 31, 1957 (and in the preceding U.S. application Ser. No. 332,422, filed Jan. 21, 1953, and now abandoned, the subject matter of such applications being also disclosed in Belgian Patent No. 530,877, granted Aug. 31, 1954). The present invention involves improvements upon the features of such teachings.

In these systems as well as others, the removal of internal beads formed in the welding of small tubing such as stainless steel tubing has presented an exceedingly formidable problem which, as far as we are aware, has never been satisfactorily solved. The extent of the problem will be appreciated when it is realized that such beads are quite hard and difficult to cut, are irregular in shape and occurrence, and are formed with numerous small nugget-like configurations.

Additionally, there is a strong tendency for metallic oxide particles known as "spume" to be thrown off as a spray internally of the advancing tube in the vicinity of the weld point. This spume tends to lodge upon the scarfing tool, or other equipment within the tube, and is in the nature of a hard grit which is extremely difficult to dispose of. Under some conditions, the spume adheres to the interior of the tube as well as parts of accessory equipment.

The problem is further complicated by the fact that in tubes with outside diameters of the order of one inch, space inside the tube is naturally at a premium, and, as pointed out in U.S. Patent No. 3,054,883 dated Sept. 18, 1962, it is desirable in high frequency resistance welding to have an impeder present in the tube adjacent the weld point in order to obtain a high welding efficiency. Thus, it will be appreciated that with an impeder present in the tube, space for a scarfing tool is minimal, particularly when it is realized that it is desirable that scarfing take place fairly close to the weld point so thatthe bead can be cut while still hot.

We have conceived by our invention an effective solution to the problems presented and have actually constructed a successful and commercially desirable embodiment of this concept which eliminates the foregoing difficulties and disadvantages.

Our invention contemplates apparatus for welding together the edges of a longitudinal gap in metal tubing, which apparatus includes means for advancing the tubing longitudinally while bringing its edges together at a weld point in a narrow V-shaped formation, means for raising the edges to welding temperature at the weld point, a scarfing tool assembly embodying a mandrel, a scarfing tool supported by the mandrel, means for mounting the mandrel inside the tubing in position relatively thereto to position a scarfing edge of the tool in the path of the advancing weld seam within the welded tube effectively to scarf the internal bead formed by the weld, and means directing the material thus removed downstream of the advancing tube.

As an important feature of our invention, we support a circular scarfing tool in the mandrel which is in turn supported within the tube. Actually, the tool is positioned at an angle in the vertical plane of the mandrel so that its cutting edge may project through an opening atop the mandrel to engage the bead in the advancing tube. An important aspect of this feature of the invention resides in the fact that the cutting edge of the tool is annular and may be indexed or rotated periodically to present a sharp arcuate section thereof for scarfing the bead when previous sections become worn. The tool may also be adjusted longitudinally by a positioning screw that is adjustable for the purpose, so that as the complete circumference of its annular cutting edge wears down, the tool may be reground and reset. In this way, the tool may be utilized for a considerable time before a new tool need be employed.

Another feature of the invention is found in the configuration of the tool supporting part or mandrel and of the tool itself whereby, as the bead is cut it is disposed of by being directed downwardly through a longitudinal bore in the tool, and into the tube to be carried away by the advancing tube for subsequent disposition when the tube is cut into definite lengths. In this connection, we provide means for positively directing the fragments of the bead down through the bore in the tool and into the tube. For this purpose, we prefer to provide an air jet fed through a tube extending along a portion of the mandrel. Actually, we direct the air jet through the aforementioned positioning screw that is bored for the purpose. In this way, any broken chips or balls that are cut from the bead, and might otherwise block up the cutting area, are blown down through the cutting tool, out the end of the mandrel and in the advancing tube.

It will be appreciated by those persons skilled in the art that, since the mandrel must extend into the formed tube, some means must be provided for maintaining the mandrel and the advancing tube stable relatively to one another so that the tool and bead will be disposed continuously in cutting relation. Heretofore, where various elements, such as mandrels of one kind or another, were mounted in advancing tubes of the class described, it was known to use rollers to maintain stability between the tube and the mounted element; but it has been found that in the welding of stainless steel tubing for example, the spume already referred to may actually be rolled into the wall of the tube by such rollers, adhering to the tube wall or scratching same. Thus, a significant part of the present contribution resides in the utilization of sliding blocks for supporting and aligning the mandrel and scarfing tool relatively to the tube and bead. These blocks are mounted on the mandrel and are preferably elongate and shaped at their upstream ends to plow away any spume to prevent it from getting between the tube and mandrel. The blocks of course contribute a pressure reaction to the cutting tool and maintain it precisely in cutting position within a few thosuandths of an inch for a uniform and controlled depth of cut.

We have already mentioned the desirability of having an impeder present adjacent the weld point and we prefer to employ a shrouded impeder of the type disclosed in U.S. Patent No. 3,054,883 according to which the magnetic material in the impeder is cooled by a jet of water or soluble oil issuing from the space between an outer and inner tube to form a crescent shaped shroud or barrier between the region of the weld point and the upper surface of the impeder. This fluid is discharged at some considerable pressure from the end of the impeder; and in the present case, we take advantage of this fact by so combining the impeder with the tool-supporting mandrel that the flowing fluid is available for continuously washing away any spume which might otherwise become entrapped between the sliding blocks and the inner surface of the tube. Thus, we effect a cooperation between the mandrel and the impeder to obtain a continuous self-cleaning action. We further enhance this action by so shaping the mandrel as to facilitate the washing or cleaning action. Thus, the mandrel may be octagonal or hexagonal in cross-sections, for example, to allow room for the spume to work downstream of the tube.

The extent of the present contribution will be fully appreciated when it is realized that in continuous welding by means of the class described, the tube is often advanced at speeds of the order of 70 to 150 feet per minute or more.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a perspective view of apparatus according to one embodiment of our invention shown in position within an advancing tube which is partly broken away for purposes of illustration;

FIG. 2 illustrates a portion of the mandrel with a section removed to illustrate its interior construction;

FIG. 3 is a fragmentary side view of apparatus according to an embodiment of our invention;

FIG. 4 is a top plan view otherwise similar to FIG. 3;

FIG. 5 is an enlarged view, partly in longitudinal section of a portion of apparatus according to the present invention;

FIG. 6 is an exploded perspective view of a portion of apparatus according to the present invention;

FIG. 7 is a cross-sectional view taken along the line 7—7 of FIG. 5;

FIG. 8 is a cross-sectional view taken along the line 8—8 of FIG. 6; and

FIG. 9 is a cross-sectional view taken along the line 9—9 of FIG. 6.

Referring now to the drawings, and more particularly to FIG. 1 thereof, there is shown a length of metal tubing 10 advancing in the direction of the arrow through a tube mill or the like having a pair of pressure rollers 11 and 12 for pressing the opposed longitudinal edges 14 and 15 of the strip or skelp together in a firm contact at the weld point $w$. Contacts or electrodes 16 and 17 are shown in sliding engagement with the edges a suitable distance in advance of the weld point for applying to such edges electrical current of the order of 100,000 cycles per second or higher, for example 300,000 to 500,000 cycles per second. It will be understood that, while for purposes of illustration, we have chosen to describe the present invention in connection with a high frequency contact type welding mill, the same is equally advantageous when used in association with other welding systems such as induction welding systems, for example.

Within the tubing downstream of the weld point $w$, there is shown in FIG. 1 a mandrel 19 the exterior contour of which is octagonal in cross section.

Referring now to FIGS. 3 and 4, it will be seen that the mandrel 19 is an elongate member formed at one end with a reduced extension 20 pierced as at 21 for support by a suitable mounting device (not shown). The opposite end of the mandrel, which end is normally positioned within the welded tube, is formed with an open well 21 communicating with an upwardly and rearwardly angulated bore 22 and counterbore 24. A longitudinal bore 25 and counterbore 26 communicate with the upstream end of the open well 21 and extend upstream thereof to an enlarged open well 27 which extends upstream to a point adjacent the reduced extension 20 of the mandrel, and which may be closed for use by means of a lid 28 dovetailed to engage suitable mounting grooves formed in the edges of the well.

As we have already stated, we provide means for maintaining the mandrel and tube stable relatively to one another, and for this purpose we employ a series of elongate blocks of wear strips 29. These strips are formed preferably of plastic material such as a Teflon composition but any durable material which will not score the interior of the tube may be used. The strips are rounded at their ends and are positioned in recesses on alternate exterior facets of the octagonal mandrel, as clearly shown in FIGS. 8 and 9. We illustrate strip clamps or locks 30 for retaining the strips in place; and in this connection, it will be understood that other means such as dovetail joints may be used for this purpose. As best shown in FIGS. 2 and 3, the illustrated locks 30 are simply flat plates with their side edges ground in two planes to a point. The angles of the ground planes are such that one such plane bears against a side of each of the strips 29 and the plates are mounted in the aforementioned recesses in the mandrel by means of screws 31 (FIGS. 1, 2 and 3). By reason of this construction, the same mandrel can be used in tubing of various sizes by utilizing wear strips of appropriate thickness according to the tube diameter or by adjusting the extent to which the strips are seated in their respective recesses.

As shown in FIGS. 1, and 5 to 7, the scarfing tool cutter 32 is actually an annular sleeve having one end internally ground to a sharp edge 34. The tool is positioned in the angulated bore 22 and is held securely in place by a hollow Allen screw 35 threaded into the counterbore 24. It will be seen that the cutting edge 34 of the tool projects upwardly out of the open well 21 and may be positioned somewhat above the upper surface of the mandrel to engage the internal bead in the advancing tube. At this point it is well to mention that when a cutting area of the tool becomes dulled, it is a simple matter to remove the Allen screw 35, rotate the tool 32 slightly to present to the bead an unused portion thereof, and then replace the screw. As indicated in FIGS. 5 and 7, as the bead is scarfed, it falls down through the hollow tool 32 and screw 35 into the advancing tube for disposition when the tube is later cut into definite lengths.

In order to adjust the height of the cutting tool relatively to the mandrel, an adjusting plug 36 (FIGS. 4, 5 and 6) is provided which may take the form of a U-shaped member partitioned at one end. This plug sits in the open well 21 and serves as an abutment for the lower front edge of the tool 32. A hollow screw 37 is adjustable in the counterbore 26 and bears against the partitioned end of the plug 36 thus to adjust the position of the plug in the well. This, in turn, in cooperation with the Allen screw 35, adjusts the longitudinal position of the tool 32 in the bore 22. To prevent rotation of the plug 36 and to maintain proper angularity when adjustments of the tool 32 are made, the bottom of the plug has an opening 39 for reception of a stationary pin 40 mounted in the mandrel body. By reason of this construction, when the tool has been indexed 360° and is completely dulled, it may be reground and reset in cutting position. Additionally, close adjustment to different cutting heights may be set and maintained by means of the screw 37.

We have already alluded to the fact that an impeder is desirable in high frequency resistance welding, and such impeder should be present in the tube adjacent the weld point. Accordingly, we have provided for the presence of an impeder in our present construction. Thus, in FIGS. 3 and 4 an impeder 41 is schematically represented as being located within the well 27. It is well to mention here that the mandrel should be made of nonmagnetic stainless steel, for example, so that its influence upon the impeder is kept to a minimum and it does not become heated by induction.

Water or oil is used to cool the impeder and to prevent the accumulation of spume, as clearly explained in the aforementioned Patent No. 3,054,883. The cooling fluid is delivered to the impeder through a flexible hose 42 which enters the upstream end of the mandrel through a recess 44 for the purpose, and is discharged with considerable force from the impeder in a downstream direction in a manner to provide a fluid barrier to wash away any spume falling from the vicinity of the weld point. It will be apparent that this stream of fluid, in the present combination, will be contained within the well 27 of the mandrel. We therefore utilize this fluid to advantage in the following way. We provide four through bores 45 from the downstream end of the well 27 through the mandrel 19 at about 45° to its longitudinal axis, in position so that each such bore exits from the mandrel just upstream of an end of one of the wear strips 29. By reason of this arrangement, any spume which might otherwise become entrapped between the strips and the tube surfaces is washed way in a continuous self cleaning action.

We have also referred to the fact that the chips or balls of beading cut away from the welding seam are blown by a jet of air down through the cutting tool and into the advancing tube. Thus, we provide for a jet of air by means of a suitable tube or conduit 46 which enters the upstream end of the mandrel through a recess 47 communicating with the impeder well 27. The air tube runs along beneath the impeder and then upwardly through the bore 25 and to the hollow adjusting nut 37 positioned in the counterbore 26. The air jet is discharged through the nut 37 and an orifice 49 in the partitioned end of the plug 36 to blow the chips down through the cutting tool 32 and the hollow screw 35 into the tube 10.

From the foregoing description, it will be seen that we contribute a novel apparatus for accurately presenting a scarfing tool to a welding bead internally of a tube for continuous removal of such bead at high speeds, while at the same time effectively providing for removal of the chips cut from the bead and for spume directed into the tube from the weld point. At the same time, we avoid interference with the presence of an impeder within the tube beneath the weld point, even in tubes of small diameter, while positioning the cutting tool close enough to the weld point to effect cutting while the bead is still hot. In this connection, we have run one inch tubing at 100 feet per minute and with a wall thickness of 0.049 inch with the distance between the weld point and the edge of the cutting tool no greater than 8½ inches. This latter dimension would be lengthened as the tube speed increased. It will be appreciated too, that we contribute such apparatus wherein the cutting tool may readily be adjusted annularly and longitudinally to provide extended life and accurate presentation to the bead.

We believe that the construction and operation of our invention will now be understood, and that the advantages thereof will be fully appreciated by those persons skilled in the art.

We now claim:

1. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying a mandrel, a scarfing tool supported by said mandrel and formed with an annular cutting edge, means for mounting said mandrel inside the tubing in position relatively thereto to position the cutting edge of said tool along the path of the advancing weld seam within said welded tube effectively to scarf the internal bead formed by the weld, adjustment means for permitting the scarfing tool to be extended and retracted relatively to the circumference of said mandrel thus to permit variation of the depth of cut, means for permitting positioning relative to the mandrel of said tool in various annular positions to present different arcuate sections thereof for scarfing the bead, and means for directing the fragments scarfed from the bead through a portion of said mandrel and downstream in the advancing tube.

2. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying a mandrel, a hollow annular scarfing tool supported by said mandrel, means for mounting said mandrel inside the tubing in position relatively thereto to position a scarfing edge of said tool in the path of advancing weld seam within said welded tube effectively to scarf the internal bead formed by the weld, and means for directing the fragments scarfed from the bead through the scarfing tool and downstream into the advancing tube.

3. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying a mandrel, a hollow scarfing tool having an annular cutting edge and supported by said mandrel, a well in said mandrel adjacent the cutting edge of said tool, means for mounting said mandrel inside the tubing in position relatively thereto to position the cutting edge of said tool in the path of advancing weld seam within said welded tube effectively to scarf the internal bead formed by the weld whereby the scarfed fragments fall into said well, and fluid jet means for directing the fragments scarfed from the bead through the scarfing tool and downstream in the advancing tube.

4. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying a mandrel, a scarfing tool supported by said mandrel, means including wear strips positioned between the mandrel and tube for mounting said mandrel to be slidable with respect to the inside of the tubing and in position relatively thereto to position the scarfing edge of said tool along the path of the advancing weld seam within the welded tube effectively to scarf the internal bead formed by the weld, and means for directing fluid along the wear strips to wash away spume falling from the vicinity of the weld point.

5. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying a mandrel, a scarfing tool supported by said mandrel, a plurality of wear strips positioned between said mandrel and the tube to position the scarfing edge of said tool along the path of the advancing weld seam within the welded tube effectively to scarf the internal bead formed by the weld, said strips being contoured to plow through spume formed by the weld, and means for washing such spume along between the tube and mandrel in a direction downstream of the tube.

6. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying mandrel means having a different cross-sectional contour than that of the tube, a scarfing tool supported by said mandrel, a plurality of wear strips positioned between said mandrel means and the tube to position the scarfing edge of said tool along the path of the advancing weld seam within the welded tube effectively to scarf the internal bead formed by the weld, said strips being contoured to plow through spume formed by the weld, and means for washing spume formed at the weld region, along between the tube and mandrel means in a direction downstream of the tube.

7. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, an assembly embodying a mandrel means, impeder means supported by said mandrel means adjacent the weld point, a scarfing tool being supported by said mandrel means subsequent to the weld point, means including wear strips positioned between the mandrel means and tube for mounting said mandrel means inside the tubing in position relatively thereto to position a scarfing edge of said tool along the path of the advancing weld seam within the welded tube effectively to scarf the internal bead formed by the weld, adjustment means for permitting the scarfing tool to be extended and retracted relatively to the circumference of said mandrel means, and means for directing a fluid barrier along between the impeder and weld point and towards the upstream ends of the wear strips to wash away spume falling from the vicinity of the weld point.

8. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying a mandrel means, impeder means supported by said mandrel means adjacent the weld point, a scarfing tool supported by said mandrel means and formed with an annular cutting edge, means including wear strips positioned between the mandrel and tube for mounting said mandrel means inside the tubing in position relatively thereto to position said edge of said tool along the path of the advancing weld seam within said welded tube effectively to scarf the internal bead formed by the weld, adjustment means for permitting the scarfing tool to be extended and retracted relatively to the circumference of said mandrel means, and means for directing a fluid barrier along between the impeder and weld point and towards the upstream ends of the wear strips to wash away spume falling from the vicinity of the weld point, means for permitting positioning of said tool in various annular positions to present different arcuate sections thereof for scarfing the bead, and means for directing the fragments scarfed from the bead through a portion of said mandrel means and downstream in the advancing tube.

9. In apparatus for welding a longitudinal seam in metal tubing, which apparatus includes means for advancing the tubing longitudinally while pressing together at a weld point the metal edges which are to be welded together in forming the seam, means for raising the edges to welding temperature upon reaching the weld point, a scarfing tool assembly embodying a mandrel means, impeder means supported by said mandrel means adjacent the weld point, a hollow annular scarfing tool supported by said mandrel angularly relatively thereto whereby to present a scarfing edge outwardly beyond the surface of said mandrel means, a well in said mandrel means, said scarfing edge projecting over said well, means including a plurality of wear strips positioned between the mandrel and tube for mounting said mandrel means inside the tubing in position relatively thereto to position the scarfing edge of the tool along the path of the advancing weld seam within said welded tube effectively to scarf the internal bead formed by the weld, means for adjusting said scarfing tool longitudinally to permit its cutting edge to be extended and retracted relatively to the circumference of said mandrel means to engage and scarf beading extending into said well, means for directing a spray of fluid along between the impeder and weld point and towards the upstream ends of the wear strips to wash away spume falling from the weld point, means for permitting positioning of said tool in various annular positions to present different arcuate sections thereof for scarfing the bead, and fluid jet means directing the fragments scarfed from the bead through the annular scarfing tool and downstream in the advancing tubing.

10. Apparatus for scarfing away the bead formation from a longitudinally-extending welded seam in metal tubing, comprising in combination: a hollow scarfing tool formed at one end with an annular cutting edge; mandrel means for extending longitudinally within the tubing, said mandrel means having portions shaped to receive said scarfing tool and retain same with the center line of said annular cutting edge at an angle to the longitudinal axis of the mandrel means such that a portion of said cutting edge protrudes in active position beyond the contours of the mandrel means to provide for scarfing engagement of such portion with the bead formation, said scarfing tool being angularly adjustable about its said center line within said retaining portions of the mandrel to permit various different portions around said cutting edge to be brought into said active protruding position.

11. Apparatus in accordance with the foregoing claim 10 and in which a plug-like member is mounted within said mandrel means, one end of said plug-like member being shaped to engage portions of said cutting edge other than the protruding portion and means at the other end of said plug-like means for adjusting the position thereof longitudinally with respect to the center line of said cutting edge, thereby to adjust the extent to which a portion of said cutting edge is permitted to protrude, other adjustable means being provided at the end of said cutting tool opposite from the cutting edge for retaining the cutting edge portions of the tool in engagement with said plug-like means.

12. Apparatus for scarfing away the bead formation from a longitudinally-extending welded seam in metal tubing, said apparatus comprising in combination: a scarfing tool carried by mandrel-like means adapted to be mounted within the tubing while the tubing is being longitudinally advanced and the bead formation therein is being scarfed away by such scarfing tool, said mandrel-like means being of a non-circular cross-sectional contour different from that of the tubing within which same is to be received, whereby at angularly-spaced positions about the mandrel-like means there will be spaces between the surface thereof and the interior surface of the tubing, along which spaces spume from a welding operation may be washed; a plurality of wear strips mounted at angularly spaced-apart positions about the surface of such mandrel-like means for retaining the latter in a position with respect to the interior surfaces of the tubing whereby said scarfing tool will be retained in a predetermined position with respect to the welded seamline of the tubing; and means for directing washing fluid along between the interior surfaces of the tubing and said mandrel means.

References Cited

UNITED STATES PATENTS

| | | | |
|---|---|---|---|
| 2,025,422 | 12/1935 | Park | 219—59 |
| 2,189,339 | 2/1940 | Black et al. | 219—59 |
| 2,379,238 | 6/1945 | Johnston | 219—6 |
| 3,028,469 | 4/1962 | Bognar | 219—59 |
| 3,148,647 | 9/1964 | Woolley et al. | 228—13 |

FOREIGN PATENTS 915,650  1/1963  Great Britain.

JOHN F. CAMPBELL, *Primary Examiner.*

M. L. FAIGUS, *Assistant Examiner.*